United States Patent [19]
Garnett et al.

[11] Patent Number: 5,931,069
[45] Date of Patent: Aug. 3, 1999

[54] CRANKSHAFT TURNING MACHINE

[75] Inventors: Donald W. Garnett, Grand Ledge; Stephen P. Smith, Lansing, both of Mich.

[73] Assignee: The Olofsson Corporation, Lansing, Mich.

[21] Appl. No.: 08/980,661

[22] Filed: Dec. 1, 1997

[51] Int. Cl.⁶ .................................................. B23B 5/22
[52] U.S. Cl. ............................. 82/106; 82/107; 82/108; 82/109
[58] Field of Search ............................ 82/106, 107, 108, 82/109; 29/6.01; 451/180

[56] References Cited

U.S. PATENT DOCUMENTS

| | | | |
|---|---|---|---|
| 1,451,078 | 4/1923 | Mantha | 82/106 |
| 2,261,086 | 10/1941 | Hunt | 82/106 |
| 2,599,931 | 6/1952 | Mosca | 82/106 |
| 2,733,560 | 2/1956 | Strnad | 82/106 X |

FOREIGN PATENT DOCUMENTS

| | | | |
|---|---|---|---|
| 0570215 | 2/1959 | Canada | 82/109 |
| 0074503 | 4/1987 | Japan | 82/109 |

*Primary Examiner*—Andrea L. Pitts
*Assistant Examiner*—Henry W. H. Tsai
*Attorney, Agent, or Firm*—Reising, Ethington, Barnes, Kisselle, Learman & McCulloch, P.C.

[57] ABSTRACT

Apparatus for machining first and second throws on a crankshaft wherein the throws are displaced outwardly from the central axis of the shaft in angularly spaced relation to one another. The crankshaft is gripped by a collet. The collet is mounted on a spindle at a point offset radially from the spindle axis. The collet is capable of rotating from a first position in which the first throw is on the axis of spindle rotation to a second position in which the second throw is on the axis of spindle rotation. A tool is provided for cutting the throws when the collet is secured in either one of the two positions. A collet receiver is provided to open and close the collet. A housing for the collet and collet receiver is mounted on the spindle. The collet is locked in each of the two rotative positions by interengaging teeth on the collet receiver and on the housing. When the collet receiver is moved relative to the housing, the teeth become disengaged so that the collet is free to rotate. Thereafter by relatively moving the collet and collet receiver, the collet is opened to release the crankshaft.

15 Claims, 9 Drawing Sheets

CRANKSHAFT TURNING MACHINE

FIELD OF THE INVENTION

This invention relates generally to machines to turn or grind crankshafts which have throws angularly displaced from one another.

BACKGROUND AND SUMMARY OF THE INVENTION

For vibrationless efficient operation of equipment that utilizes crankshafts with multiple throws, the throws must be machined precisely parallel and accurately displaced angularly from one another. In the past, "two-throw" crankshafts have been chucked with one of the throws on centerline of lathe rotation for machining the first throw. The crankshaft has then been removed and rechucked in a second chuck with the second throw on centerline of lathe rotation for machining the second throw. The rechucking introduces alignment and orientation errors between the first and second throws.

One object of this invention is to provide a first and second precise positioning of the two throws without rechucking, thus eliminating the errors introduced by multiple chucking of the crankshaft.

Another object is to eliminate the labor and production time lost in the second handling of the crankshaft which involves the unclamping, unloading, reloading in a second chuck, and reclamping the part with the second throw on centerline of lathe rotation.

Another object is to provide a part chuck which consists of a relatively few simple parts, is rugged and durable in use, is capable of being inexpensively manufactured, and will operate reliably in a contaminated cutting tool environment.

These and other objects, features and advantages of the invention will become more apparent as the following description proceeds, especially when considered with the accompanying drawings.

DETAILED DESCRIPTION OF THE PREFERRED EMBODIMENT

Figure 1:
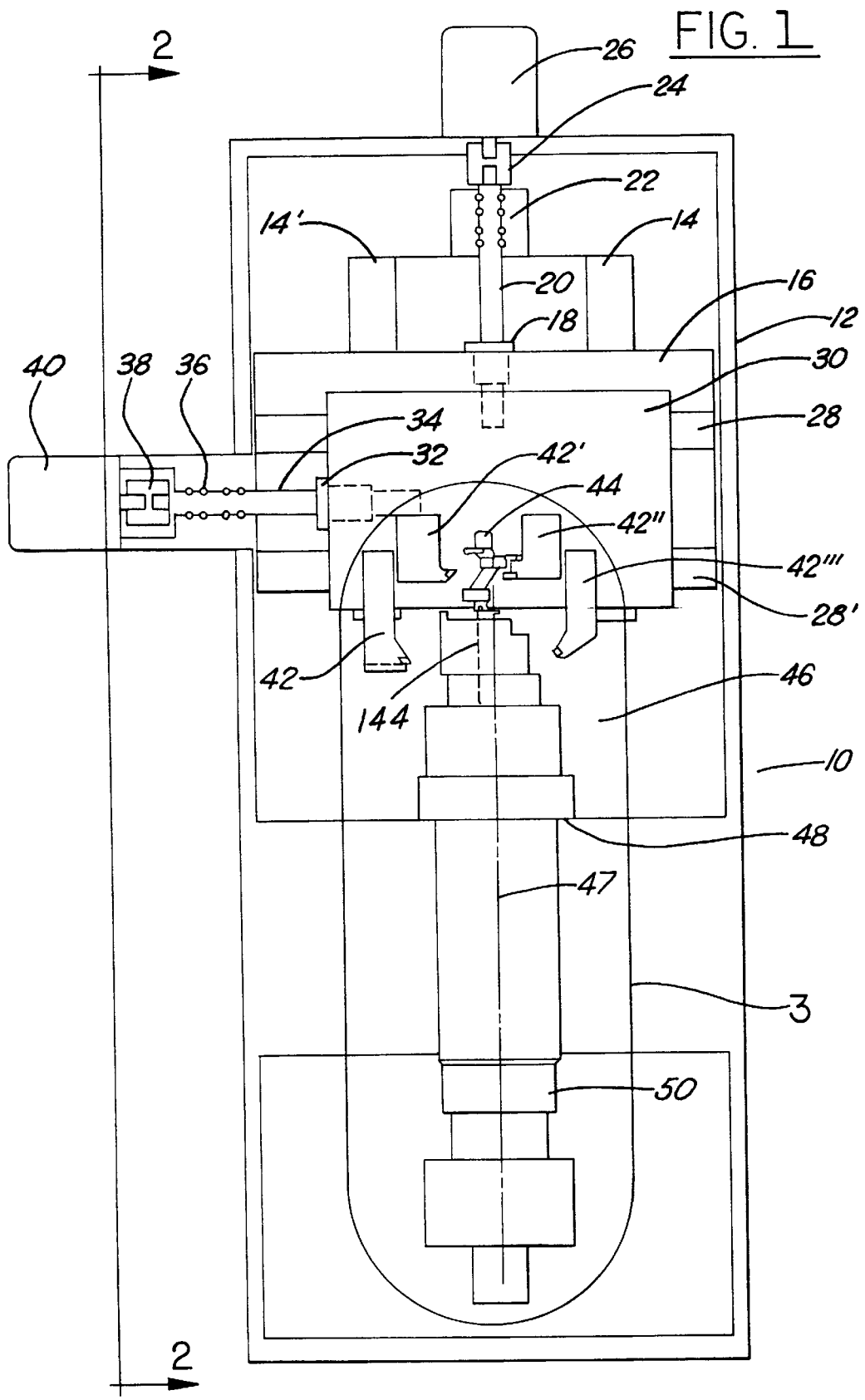
FIG. 1 is a front elevation with parts in section of a machine constructed in accordance with the invention taken along the line 1—1 in FIG. 2.
Figure 2:
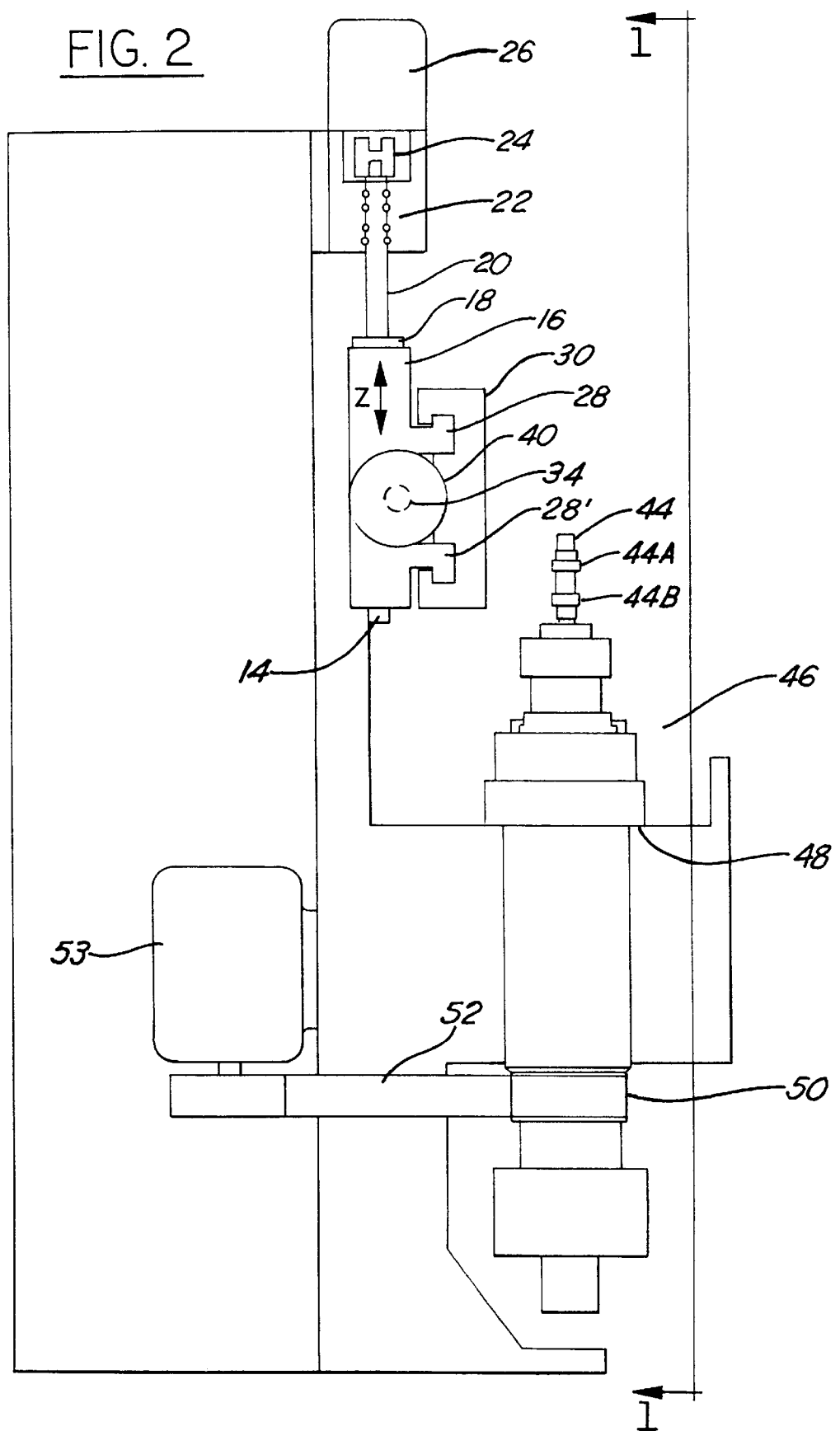
FIG. 2 is a side elevation with parts in section taken along the line 2—2 in FIG. 1, with the tools removed.

Referring now more particularly to FIG. 1 and FIG. 2, the turning machine 10 comprises a vertical lathe in which a frame 12 mounts vertical ways 14 and 14' which guide a vertical slide 16 for vertical motion. A ball nut 18 is attached to the upper surface of vertical slide 16. A ball screw 20 is threadedly engaged with the ball nut and has support bearings 22 also mounted to frame 12 to allow rotation of the ball screw 20 but prevent axial movement of the ball screw. A flexible coupling 24 is attached to the upper end of the ball screw and drivingly connects to a vertical servo motor 26 which is also mounted to frame 12. Rotation of servo motor 26 causes the threaded engagement of the ball nut and ball screw to cause vertical motion of the vertical slide 16. The machine as described is a vertical lathe with ball screw driven slides. Optionally, it could be a horizontal lathe or a lathe in any attitude. Also, optionally, the slides could be driven by hydraulics, cam, linear motors, or other means.

Vertical slide 16 mounts horizontal ways 28 and 28' which guide a horizontal slide 30 for horizontal motion. A ball nut 32 is attached to the left face of the horizontal slide 30. A ball screw 34 is threadedly engaged with the ball nut and has support bearings 36 mounted to an extension of vertical slide 16 to allow rotation of the ball screw 34, but prevent axial motion of the ball screw. A flexible coupling 38 is attached to the left end of the ball screw 34 and drivingly connects to a horizontal servo motor 40 which is also mounted to an extension of vertical slide 16. Rotation of servo motor 40 causes the threaded engagement of the ball nut and ball screw to cause horizontal motion of the horizontal slide 30 which is in turn carried by the vertical slide 16.

A single tool or multiple tools as shown 42, 42', 42", 42'" are mounted on the front face of the horizontal slide 30 and can be brought to bear in cutting relationship to a workpiece, which in this instance is a crankshaft 44, by servo-driven motion of the vertical and horizontal slides 16 and 30, respectively. The crankshaft 44 has an elongated cylindrical shank 144 and axially spaced circular throws 44A and 44B which are laterally offset equal distances on opposite sides of the longitudinal centerline of the shank 144 and 180° apart.

A spindle assembly, generally designated 46 has a centerline of rotation at line 47 with a spindle shaft 49. Spindle assembly 46 is mounted on frame 12 at 48. The spindle shaft has a driven pulley 50 attached near its lower end. A timing belt 52 connects the spindle shaft to a spindle drive motor 53 which is also mounted to frame 12. Spindle drive motor 53 is capable of driving and/or rotation orientation of the spindle.

A belt driven spindle is described but optionally the spindle could be internally motorized or driven by other means such as hydraulics.

Figure 3:
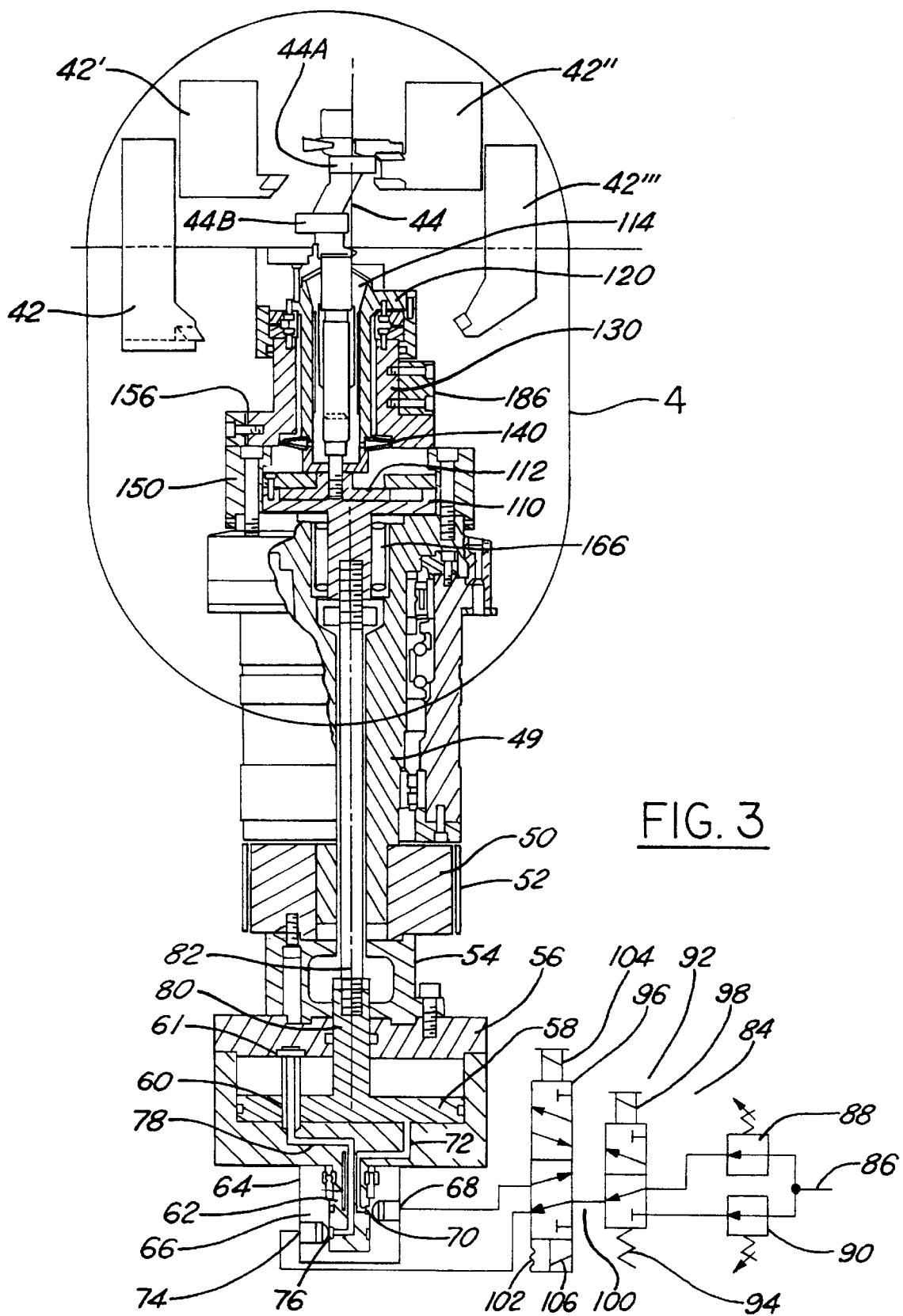
FIG. 3 is an enlarged sectional view of a portion of FIG. 1 within the oval 3, in which a crankshaft is clamped and indexed with its upper throw on the spindle centerline of the lathe.

Referring now to FIG. 3, the pulley 50 mounts an extension 54 which in turn mounts a rotary cylinder 56. A piston 58 is mounted within the rotary cylinder. The piston 58 reciprocates in the cylinder 56 to open and close a collet 114 for gripping the crankshaft 44 as described later. A tubular pin 60 is mounted from the bottom cap of the cylinder through the piston 58 and into the top cap of the cylinder. Pin 60 serves the dual purpose first of preventing rotation of the piston 58 within the rotary cylinder 56 and second as a fluid passage from the bottom cap of the cylinder 56 through the piston to its upper side. At the upper end of the pin 60 a cross drilled port 61 in the pin provides passage for fluid to the upper side of the piston.

The bottom cap 60 of the rotary cylinder has a downwardly extending shaft extension 62 which carries a rotary fluid coupling 64 well known in industry. A stationary housing 66 surrounds the shaft extension 62. Fluid pressure may be applied to the bottom side of piston 58 by stationary inlet at 68 and thence through an annular groove 70 and rotating passage 72. Alternately, fluid pressure may be applied to the top of the piston 58 by stationary inlet 74 and thence through an annular groove 76, rotating passage 78 and tubular pin 60, to cross drilled port at 61.

A rotary cylinder has thus been described, but, optionally, a stationary cylinder with a rotary mechanical connection to the rotating spindle could be substituted.

Piston 58 has a piston rod extension 80 which extends through the upper cap of rotary cylinder 56. A draw bar 82 is threadedly connected to the piston rod and serves as both pull and push to the index collet 114 for the crankshaft 44 as described later. A schematic of a fluid pressure system generally designated 84 is shown in FIG. 3. As there shown, fluid at a high pressure is introduced at port 86 and is T-connected to a high pressure fluid regulator 88 and a low pressure fluid regulator 90. These pressure regulators are well known in industry. A three-way valve 92 receives fluid pressure from both regulators. The valve is normally offset by spring 94 to deliver high pressure from a regulator 88 to a directional control valve generally designated 96. By energizing electrical solenoid 98 of the three-way valve 92, low pressure from the pressure regulator 90 may be alternately programmed to the directional valve inlet at 100.

The directional valve 96 is a two-position valve detented at 102 which allows it to maintain its position without electrical power to either its upper solenoid 104 or its lower solenoid 106. By programmed electrical power, solenoid 106 may be energized to delivery fluid pressure to the upper side of the piston 58 for draw bar pull or alternately solenoid 104 may be energized to deliver fluid pressure to the lower side of piston 58 for draw bar push. Since two levels of fluid pressure are available from systems 84, the draw bar 82 can be subjected to two levels of force of push or pull.

Figure 4:
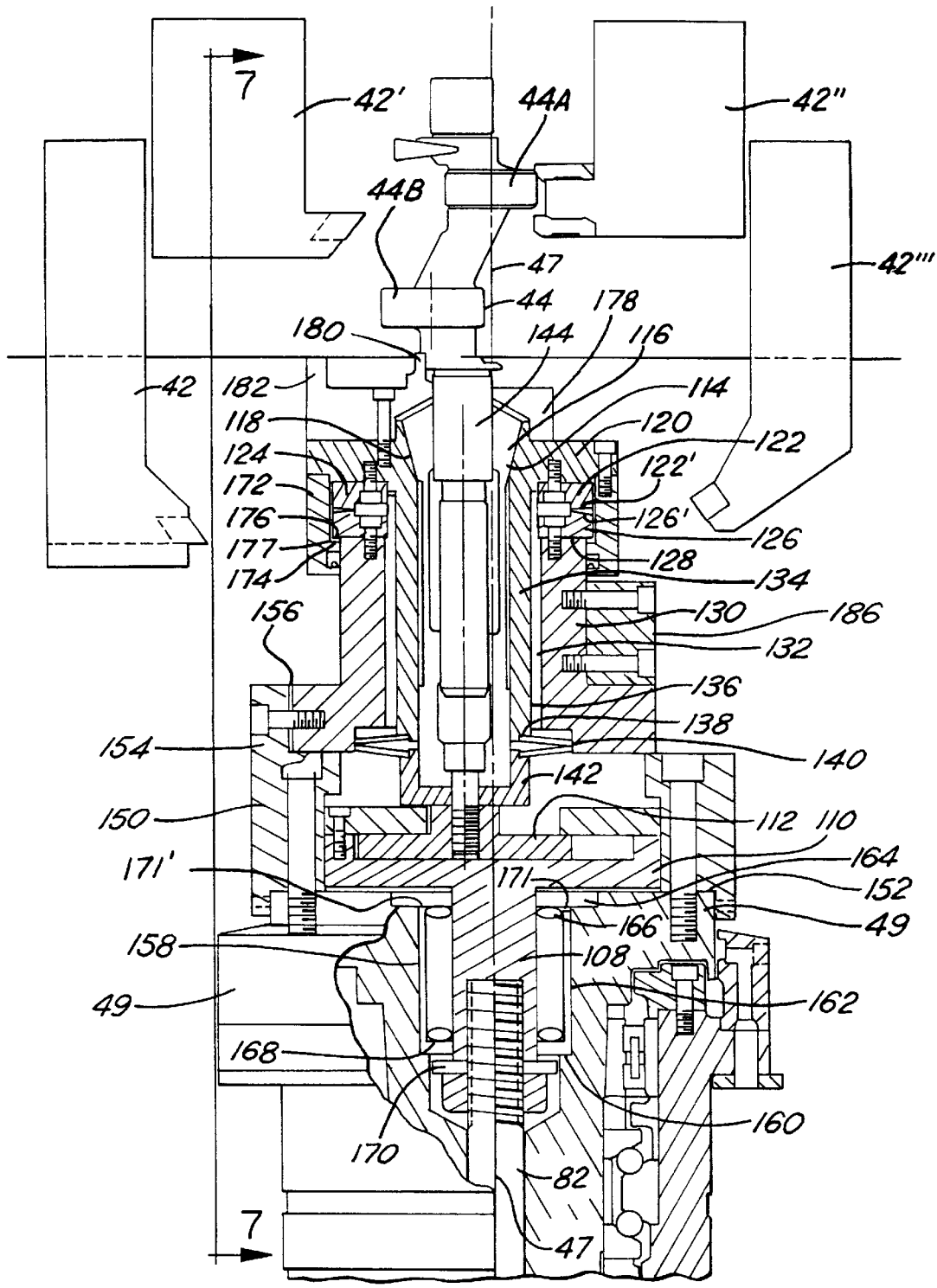
FIG. 4 is a further enlargement (for clarity) of the upper section of FIG. 3 in oval 4.

Referring now to FIG. 4, the upper end of draw bar 82 is threadedly connected to the shank 108 of a connector 110. The connector 110 in turn slidably engages a flange head 112 which is bolted to a part-holding chuck in the form of a collet 114 for gripping the shaft 144 of the crankshaft 44. The connector 110 and head 112 provide a variable coupling between the draw bar 82 and collet 114 to accommodate to variations in the radial offset of the collet.

Collet 114 has a cone-shaped segmented head 116 (See FIG. 12) enclosed in a female cone receiver 118 of collet receiver 120. Collet receiver 120 has the upper half 122 of a toothed face coupling 124 with teeth at 122' bolted to its lower face. The upper half 122 meshes with the lower half 126 of the face coupling with teeth at 126' which is in turn bolted to the upper face 128 of collet housing 130. The collet housing 130 is bushed at 132 to accept a shank extension 134 of collet receiver 120 with a small diametrical clearance 136. The collet receiver 120 is rotatably supported in the housing, but the teeth 122' and 126' when engaged lock the collet receiver against rotation.

The lower end of shaft extension 134 of the collet receiver 120 has a shoulder 138 which bears against the upper face of a preloaded Bellville spring pair 140. An adapter 142 is bolted to the lower end of collet 114 and bears against the lower face of the Bellville spring pair, thus urging the cone head 116 into the female cone receiver 118. The compliant segments of cone head 116 are thereby forced to close with their inner faces gripping the shank 144 of crankshaft 44.

A segmented collet chuck has been described, but, optionally, any one of several types of commercially known part chucks could be substituted.

Figure 7:
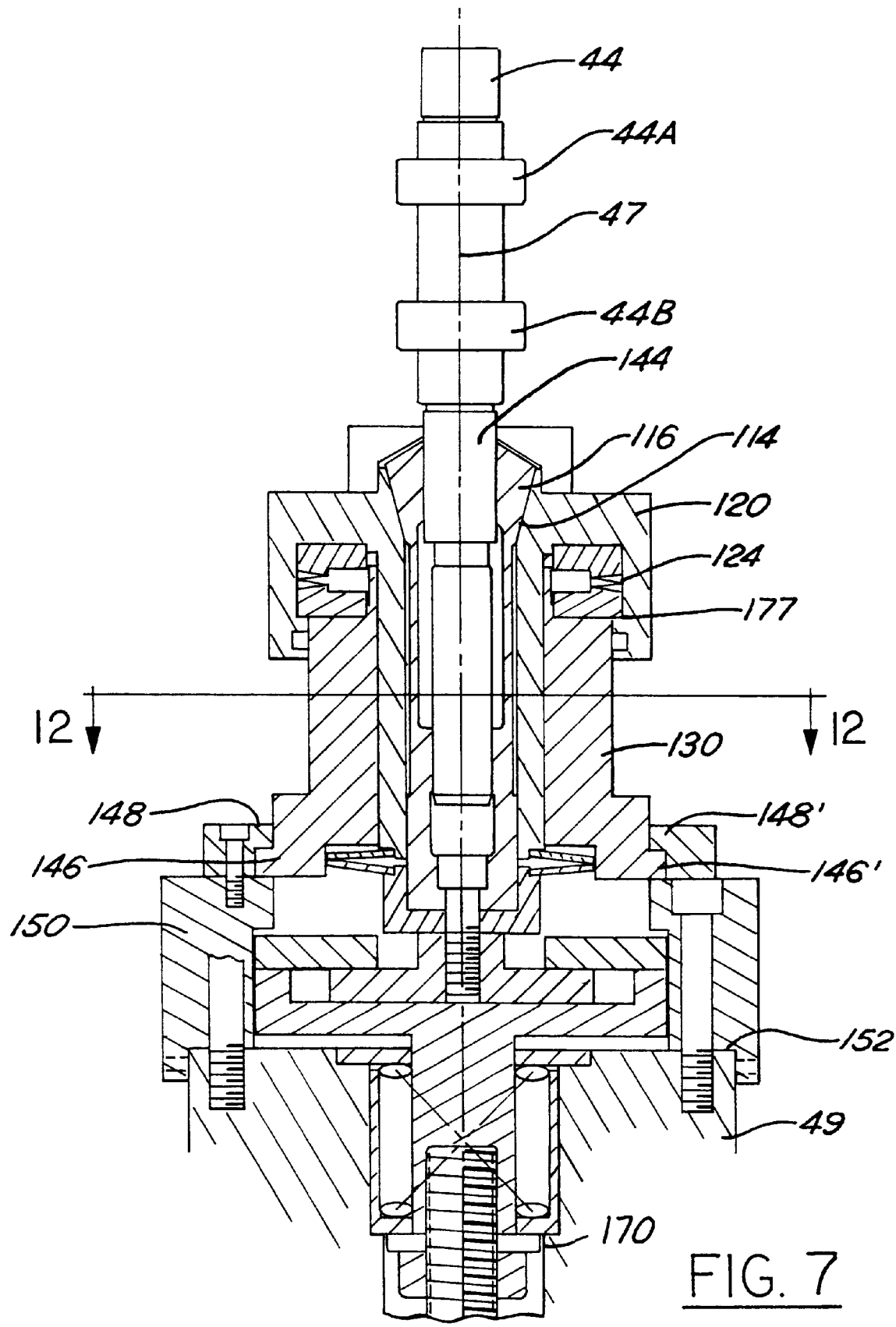
FIG. 7 is a view taken along the line 7—7 in FIG. 4 with the collet unclamped.

The collet housing 130 has gibs 146 and 146' (See FIGS. 7 and 12) retained within keepers 148 and 148'. Keepers 148 and 148' are bolted to an indexer base 150. Indexer base 150 is in turn bolted to the spindle face 152 of spindle shaft 49. Keepers 148 and 148' enable the collet housing 130 to be adjusted (with the collet 114) eccentric to the centerline 47 of spindle 46 varying amounts to match the eccentricity of the crankshaft throws.

Figure 12:
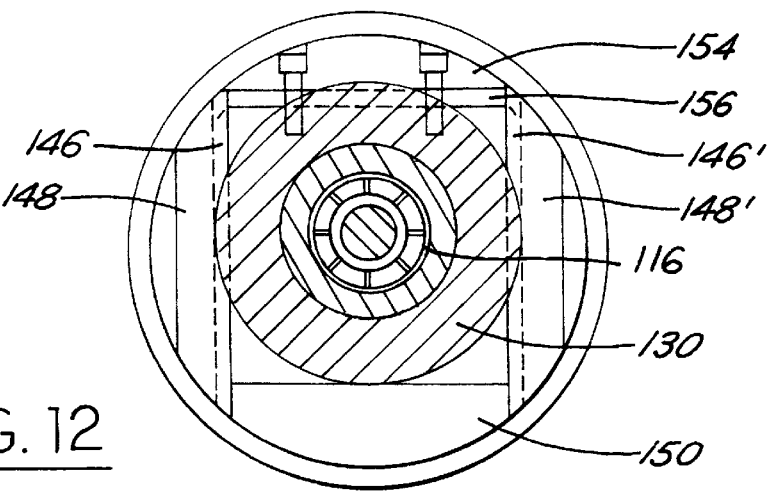
FIG. 12 is a view taken along the line 12—12 in FIG. 7 showing an adjustable mechanism for the main shaft eccentricity.

As seen in FIGS. 4 and 12, the indexer base 150 has an upward projection 154. An interchangeable fit spacer 156 is bolted between projection 154 and collet housing 130 to position the collet 114 at the desired eccentricity or radial offset to the spindle.

The spindle face 152 of spindle shaft 49 has a pocket 158 with a shoulder 160 and retains a spring housing 162. Spindle face 152 also has a closure plate 164 at the top of pocket 158. A preloaded compression spring 166 is installed in the spring housing 162 and bears against the bottom face of closure plate 164 and against the spring housing face 168. The spring housing is thereby forced against shoulder 160 under the pressure of the preloaded spring 166.

Shank 108 of the connector 110 projects downward through the bottom of the spring housing 162 a distance equivalent to that required to lift and separate the two halves of toothed coupling 124. A thrust washer 170 is bolted to the bottom of projection shank 108.

Collet receiver 120 has a downwardly extending collar 172 surrounding toothed coupling 124 with an upward travel limiting shoulder 174. The bottom face 176 of toothed half coupling 126 extends outwardly far enough to be engaged by shoulder 174 to limit the distance the collet receiver 120 may be lifted to disengage the toothed coupling 124 as shown by gap 177.

The spring housing 162 has a gap 171 between its upper face 171' and the bottom of plate closure 164 equivalent to the amount the collet must be shifted axially upward to adequately release the crankshaft 44 from clamping.

Figure 5:
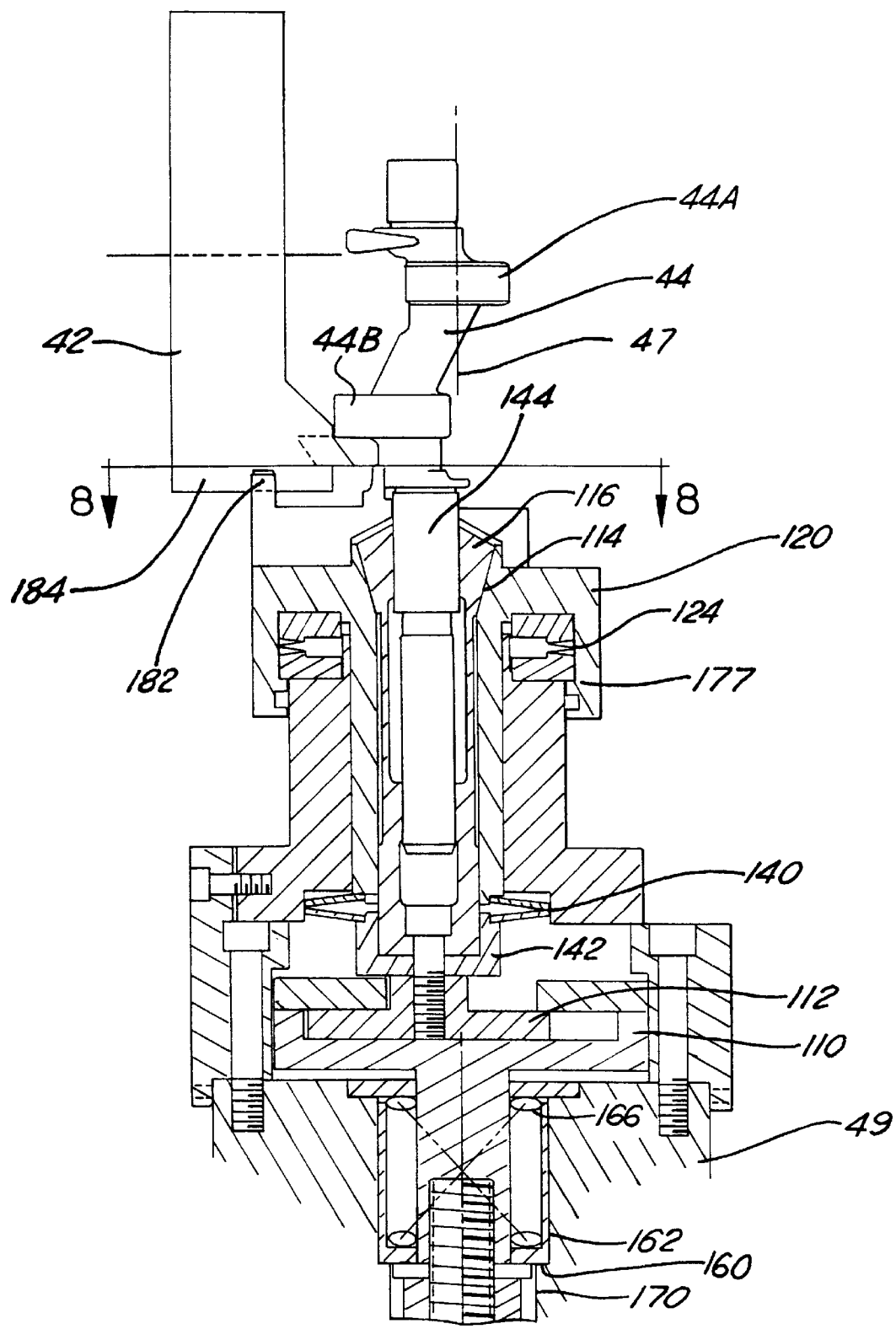
FIG. 5 is a view similar to FIG. 4 except with the toothed coupling disconnected and index pin engaged with a slotted member preparatory to indexing the chuck.
Figure 8:
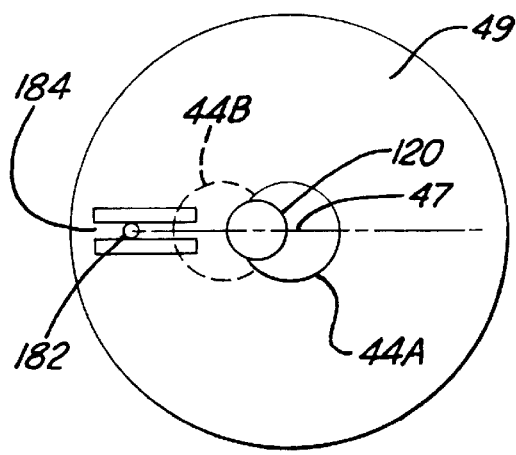
FIG. 8 is a schematic plan view taken on the line 8—8 in FIG. 5 with the upper crankshaft throw (shown by circle solid line) on the centerline of the spindle of the lathe. The lower crankshaft throw is shown in dotted line, offset from the lathe spindle centerline. Two rectangular boxes are shown separated to represent a slot containing the index pin. The main shaft of the crankshaft is shown eccentric to the lathe spindle centerline.
Figure 10:
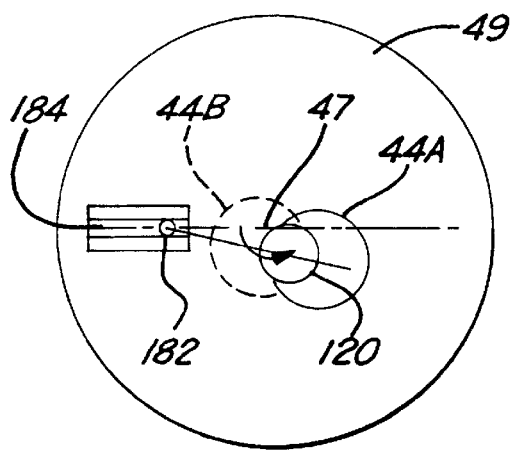
FIG. 10 is a further progression of FIG. 9 with the eccentricity of the main shaft progression 120°.
Figure 9:
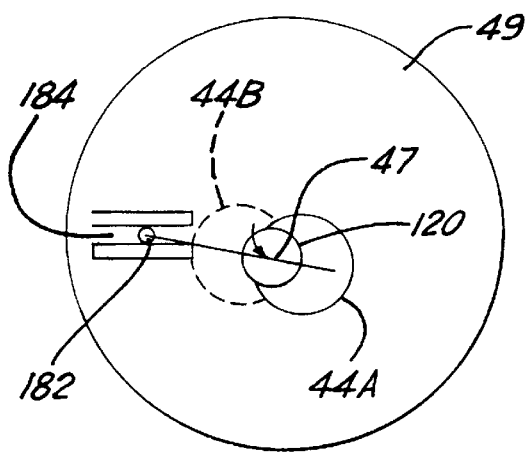
FIG. 9 is similar to FIG. 8 except the spindle has been rotated 60° carrying the eccentricity of the main shaft of the crankshaft to a first progression of the index operation.
Figure 11:
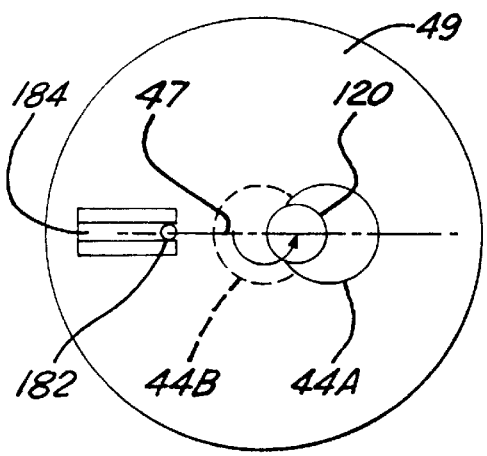
FIG. 11 is the final index position with the eccentricity of the main shaft progression 180° and the lower crankshaft throw (shown dotted) now on the lathe spindle centerline, and the upper throw offset from the spindle centerline.

A collet housing cap 178 is bolted to the top face of collet receiver 120 to exclude contamination. An upward projection 180 from this cap engages a flat or a keyway feature of the crankshaft 44 for radially orienting the crankshaft in the collet 114. A round indexing pin 182 also projects upward from collet housing cap 178. Referring to FIGS. 5 and 8, tool 42 has a downwardly opening groove 184 which has been moved to engage the index pin through the facilities of the vertical and horizontal slides 16 and 30, preparatory to indexing the collet. Although groove 184 is shown here as a feature of tool 42, it could be a feature of any suitable member.

Again referring to FIG. 4, an interchangeable counterweight 186 is shown bolted to the side of the collet housing 130. The weight of this counterweight counterbalances the unbalance caused during spindle rotation by the eccentric position of collet housing 130.

Figure 13:
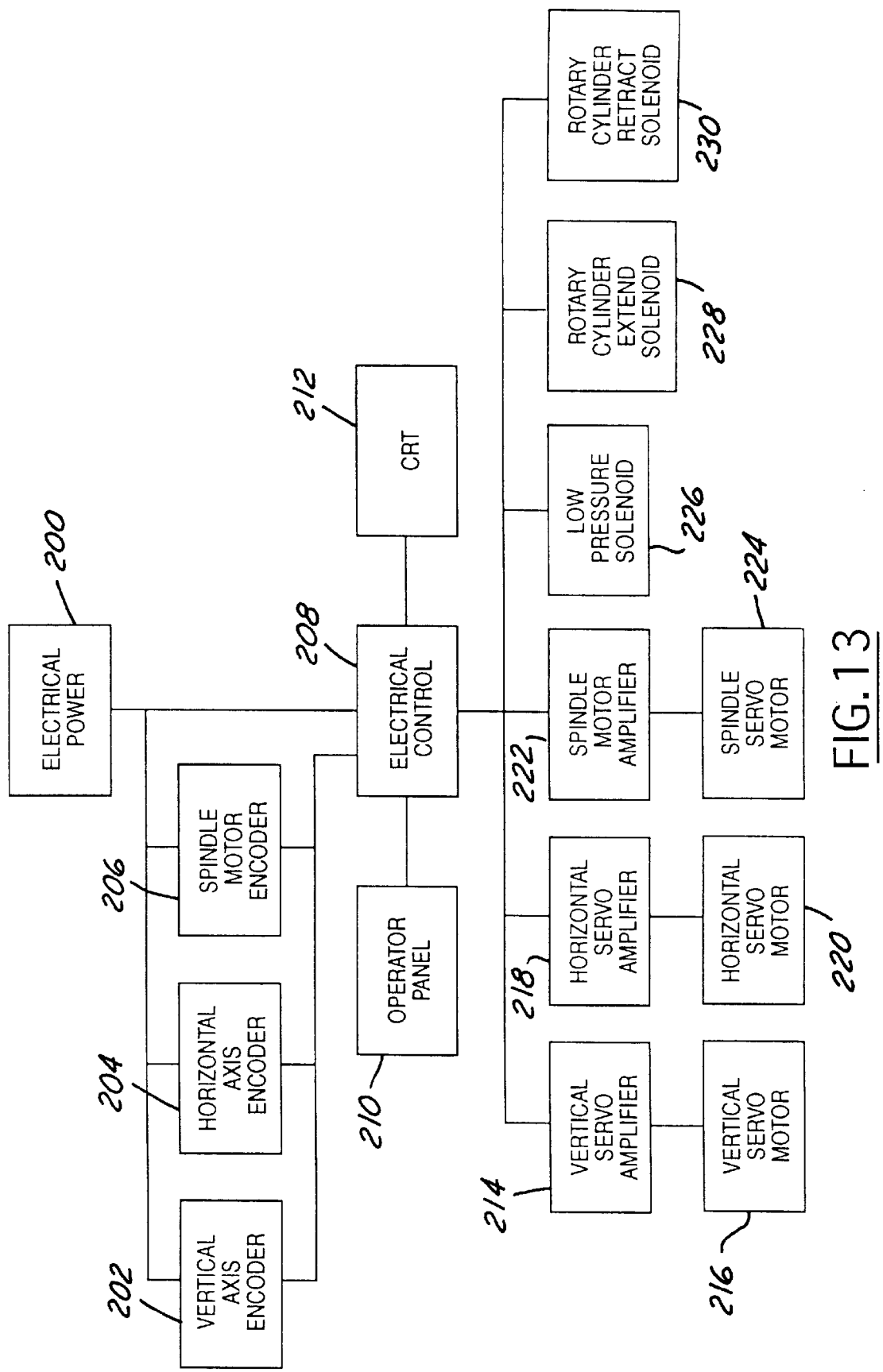
FIG. 13 is a block diagram of the electrical facilities.

FIG. 13 is a schematic representation of the electrical control.

Electrical power 200 is fed to the vertical axis encoder 202, horizontal axis encoder 204, spindle motor encoder 206, and electrical control 208.

The electrical control also receives input from encoders 202, 204, and 206 as well as from an operator panel 210. The electric control outputs information to a cathode ray tube 212.

Inputs are processed by the electrical control and outputs are sent to the following:

(1) Vertical servo amplifier 214 and motor 216
(2) Horizontal servo amplifier 218 and motor 220
(3) Spindle motor amplifier 222 and motor 224
(4) Low pressure solenoid 226
(5) Rotary cylinder extend solenoid 228
(6) Rotary cylinder retract solenoid 230

Operation of the Machine is as follows (1) The spindle 46 is oriented for loading the upper throw 44A of crankshaft 44 on centerline 47 of spindle 46, by positioning the shank 144 of the crankshaft 44 to the left of the spindle centerline 47 as shown in FIG. 4. Vertical and horizontal slides 16 and 30 are servo driven to a position with tool clearance for loading of a crankshaft 44.

(2) Solenoid 104 is energized to direct high pressure fluid to the bottom of piston 58 thus pushing draw bar 82 upward.

(3) Thrust washer 170 contacts spring housing face 160, FIG. 5. The connector 110 pushes flange head 1 12 and adapter 14-2 upward.

(4) The preload force of Bellville spring 138 is greater than the weight of collet receiver 120 and its assembly; therefore, the collet receiver assembly rises, disengaging toothed coupling teeth 122' and 126', thus allowing disengagement of collet receiver 120 from engagement with the collet housing 130.

(5) Shoulder 174 of collar 172 contacts the bottom face 176 of the half coupling 126, preventing further separation of coupling teeth 122' and 126'.

(6) Since the rotary cylinder 56 is under high fluid lift pressure, the cylinder is capable of overcoming the preload of spring 166. Spring housing 162 moves upward closing the gap 171. The collet receiver 120 is prevented from further upward movement by the engagement of shoulder 174 and bottom face 176. The collet receiver shoulder 138 is also stopped.

(8) The high fluid pressure continues to push the draw bar 82, connector 110, flange 112, adapter 142 and collet 114 upward, compressing Bellville spring 140.

(9) The segments of cone head 116 slide along the female cone surfaces 118, and cam open up under their elastic memory of their open state, separating their inner gripping faces from the crankshaft 44.

(10) A crankshaft is manually removed and a second crankshaft to be machined is oriented to projection 180 and loaded. This description is of a manually loaded crankshaft, but, optionally, it could be auto loaded by any one of several commercial devices.

(11) Solenoid 106 (FIG. 3) is energized causing directional control valve 96 to deliver high pressure fluid to the top of piston 58.

(12) Draw bar retracts allowing the Bellville spring 140 to withdraw cone head 116 into the cone receiver 120, thus camming the segments of cone head inward with their inner gripping faces engaging crankshaft 44.

(13) Further retraction of the draw bar 82, closes and engages teeth 122' and 126' under the full force of the rotary cylinder 56 under high fluid pressure. The collet gripping force is now under the combination force of the rotary air cylinder 56 and the preload force of Belleville spring 140.

(14) The spindle drive motor 53 starts and drives spindle 46. The vertical and horizontal slides 16 and 30 are servo driven to bring the desired tools into machining relation with the upper throw 44A of the crankshaft 44.

(15) When machining of the upper throw is complete, the spindle is stopped and oriented to again place the indexing pin 182 as shown in FIG. 4.

(16) Vertical and horizontal slides are used to bring the groove 184 of tool 42 into engagement with indexing pin 182 (FIG. 5).

(17) Solenoid 98 of valve 92 is energized to shift the valve to low pressure from pressure regulator 90 Solenoid 104 of valve 96 is energized to direct low pressure to the bottom of piston 58.

(18) The draw bar extends lifting the collet receiver until thrust washer 170 contacts the bottom of spring housing 162 and separating the teeth 122' and 126' from engagement (FIG. 5). Since the rotary cylinder is on low pressure, it cannot compress the preload of spring 166 and further upward motion is stopped with a slight separation at gap 177 and with the flange head 112 and the weight of the collet receiver assembly resting on the connector 110. The collet 114 remains gripped around crankshaft 44 through the preload force of spring 140.

Figure 6:
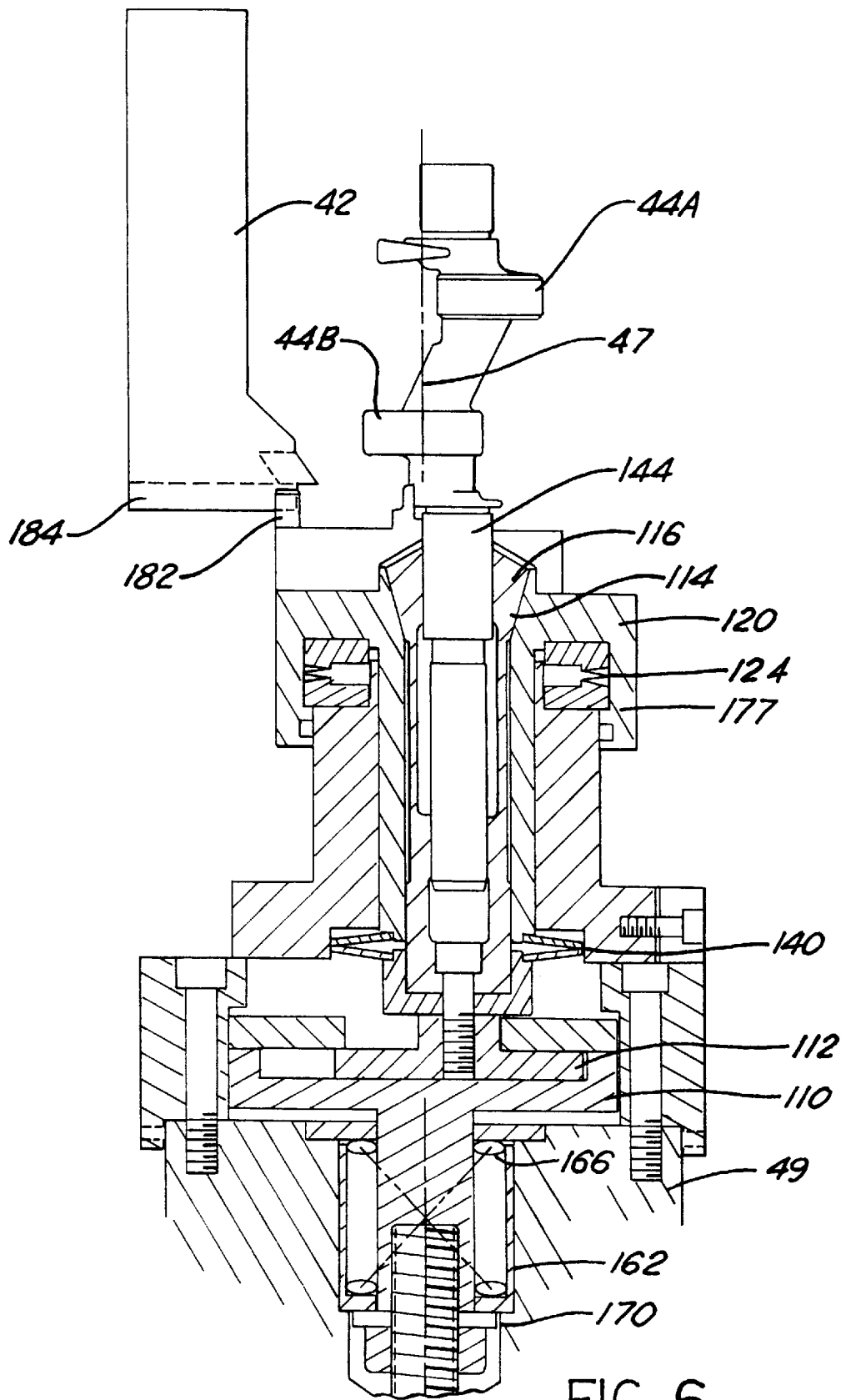
FIG. 6 is a view similar to FIG. 5 except the chuck has been indexed 180° with the lower throw on the spindle centerline of the lathe.

(19) The spindle shaft 49 is rotated 180° by motor 53 carrying the eccentricity of collet housing 130 to the right side of spindle centerline 47 as shown in FIG. 6 (180° from its position in FIGS. 4 and 5). Since collet receiver 120 is prevented from rotation by the engagement of indexing pin 182 with groove 184, the collet receiver 120 translates about the spindle centerline 47, ending with the lower crankshaft throw 44B on the spindle centerline. Thus, the collet 114 and collet receiver 120 are rotated 180° relative to the spindle 49. The translation is best seen in the schematic FIGS. 8 through 11. During translation, the pin 182 slides along groove 184 and flange bead 112 slides about the connector 110 to a new eccentric position as shown in FIG. 6.

(20) Solenoid 106 is energized causing valve 96 to direct fluid pressure above piston 58 causing draw bar 82 to retract, pulling the collet receiver assembly downward, thus re-engaging teeth 122' and 126' of toothed coupling 124. The teeth are now engaged at 180° rotation from the position in FIGS. 4 and 5. Solenoid 98 of valve 92 is deenergized and the valve shifts applying high fluid pressure downward on piston 58 and the closing the toothed coupling under high pressure. The repositioning of the crankshaft 44 from upper throw 44A on centerline 47 of spindle 49, to lower throw 44B on centerline 47 without unclamping the collet 114 from the crankshaft is one object of this invention. The precise 180° rotation, maintained parallelism between crankshaft throws, and correct throw offset are thereby attained.

(21) The vertical and horizontal slide facilities are used to disengage groove 184 from engagement with indexing pin 182 and the desired tools are brought into machining relationship to the lower throw 44B of crankshaft 44. The spindle rotation begins.

(22) When machining of the lower throw 44B is complete, the spindle is stopped and oriented as shown in FIG. 6. Groove 184 reengages pin 182.

(23) In a repeat of steps 17, 18 and 19, solenoid of valve 92 is energized to shift the valves to low pressure. Solenoid 104 is energized to direct low pressure to the bottom of piston 58. The teeth 122' and 126' are disengaged. The spindle is rotated 180° returning the eccentricity of collet housing to the position shown in FIGS. 4 and 5. The machine has now been returned to its original condition and the machine process may repeat.

The object of machining both throws of the crankshaft without a second handling of the parts by an operator has thereby been achieved.

What is claimed is:

1. An apparatus for machining axially spaced first and second throws on a shaft having a central axis wherein the throws are displaced laterally outwardly from said central axis in angularly spaced relation to one another, comprising
    a spindle having an axis of rotation,
    means for axially rotating the spindle,
    a chuck for gripping the shaft,
    means for supporting the chuck on the spindle in a first position in which the first throw of the shaft gripped by the chuck is on the axis of spindle rotation and in a second position in which the second throw of the shaft gripped by the chuck is on the axis of spindle rotation,
    a tool for cutting the throws of the shaft gripped by the chuck when the chuck is secured to the spindle in said respective positions,
    said supporting means for said chuck including means for mounting said chuck on said spindle at various points offset radially from the spindle axis,
    said means for mounting said chuck on said spindle comprising a chuck housing, an index base secured to the spindle, and spacer means between said index base and said housing.

2. The apparatus according to claim 1, and further including means for opening and closing said chuck to release and grip the shaft comprising a draw bar extending through an axial passage in said spindle, and a variable coupling between said draw bar and said chuck to accommodate to the radial offset of said chuck.

3. An apparatus for machining axially spaced first and second throws on a shaft having a central axis wherein the throws are displaced laterally outwardly from said central axis in angularly spaced relation to one another, comprising
    a spindle having an axis of rotation,
    means for axially rotating the spindle,
    a chuck for gripping the shaft,
    means for supporting the chuck on the spindle in a first position in which the first throw of the shaft gripped by the chuck is on the axis of spindle rotation and in a second position in which the second throw of the shaft gripped by the chuck is on the axis of spindle rotation,
    a tool for cutting the throws of the shaft gripped by the chuck when the chuck is secured to the spindle in said respective positions,
    said supporting means for said chuck including means for mounting said chuck on said spindle at various points offset radially from the spindle axis,
    means for opening and closing said chuck to release and grip the shaft comprising a draw bar extending through an axial passage in said spindle,
    a variable coupling between said draw bar and said chuck to accommodate to the radial offset of said chuck,
    said variable coupling comprising a connector secured to said draw bar, and
    a head on said chuck slidably engaged with said connector.

4. An apparatus for machining axially spaced first and second throws on a shaft having a central axis wherein the throws are displaced laterally outwardly from said central axis in angularly spaced relation to one another, comprising
    a spindle having an axis of rotation,
    means for axially rotating the spindle,
    a chuck for gripping the shaft,
    means for supporting the chuck on the spindle in a first position in which the first throw of the shaft gripped by the chuck is on the axis of spindle rotation and in a second position in which the second throw of the shaft gripped by the chuck is on the axis of spindle rotation,
    a tool for cutting the throws of the shaft gripped by the chuck when the chuck is secured to the spindle in said respective positions,
    means mounting said chuck on said spindle in radially spaced relation to the spindle axis wherein the shaft is supported by the chuck in laterally spaced parallel relation to the spindle axis,
    said chuck being axially rotatable relative to said spindle to said first and second positions, and
    releasable lock means are provided to retain said chuck in said respective first and second positions,
    wherein said chuck comprises a collet,
        a collet receiver,
        said collet being capable of closing and opening to hold the shaft when closed and to release the shaft when open,
        said collet receiver being adapted to open the collet in response to relative movement of said collet and collet receiver in one direction and to close the collet in response to relative movement of said collet and collet receiver in another direction,
        said lock means including first teeth on said collet receiver and second teeth affixed to said spindle adapted to engage said first teeth, and
        means for moving said collet receiver relative to said spindle to disengage said teeth and thereby release said lock means and thereafter to relatively move said collet and collet receiver in said one direction to open said collet and release the shaft.

5. The apparatus as defined in claim 4, wherein said second teeth are mounted on a housing for said collet secured to said spindle.

6. An apparatus for machining axially spaced first and second circular throws on a shaft having a central axis wherein the throws are displaced laterally outwardly equal distances on diametrically opposite sides of said central axis, comprising
    a spindle having an axis of rotation,
    means for axially rotating the spindle,
    a collet for gripping the shaft,
    means for mounting said collet on said spindle at a point offset radially from the spindle axis wherein the shaft is supported by the collet in laterally spaced parallel relation to the spindle axis,
    said mounting means including means supporting said collet for rotation to a first position in which the first throw of the shaft gripped by the collet is on the axis of spindle rotation to a second position 180° from the first position in which the second throw is on the axis of spindle rotation, a tool for cutting the throws of the shaft gripped by the collet when the collet is secured in said respective positions, means for releasably locking said collet in said first and second positions, said mounting means for said collet being capable of mounting said collet on said spindle at various points offset radially from the spindle axis, said means for mounting said collet on said spindle comprising a housing for said collet, an index base secured to said spindle, and a spacer clamped between said index base and said collet housing.

7. The apparatus according to claim 6, and further including a collet receiver, said collet being capable of closing and opening to hold the shaft when closed and to release the shaft when open, said collet receiver being adapted to open the collet in response to relative movement of said collet and collet receiver in one direction and to close the collet in response to relative movement of said collet and collet receiver in another direction, said lock means including interengaging teeth on said collet receiver and said housing, and means for moving said collet receiver relative to said housing to disengage said teeth and thereby release said lock means and thereafter to relatively move said collet and collet receiver in said one direction to open said collet and release the shaft.

8. The apparatus according to claim 7, wherein said means for moving said collet receiver comprises a draw bar extending through an axial passage in said spindle, and a variable coupling between said draw bar and said coupling to accommodate the variable radial offset of said collet.

9. The apparatus according to claim 8, wherein said variable coupling comprises a connector secured to said draw bar, and a head on said collet slidably engaged with said connector.

10. The apparatus according to claim 6, and further including selectively operable means for preventing rotation of said collet when said locking means is released, whereby a translation of said collet from one said position to the other may be effected by a partial rotation of said spindle by said rotating means.

11. The apparatus according to claim 9, and further including selectively operable means for preventing rotation of said collet when said locking means is released, whereby a translation of said collet from one said position to the other may be effected by a partial rotation of said spindle by said rotating means.

12. The apparatus according to claim 11, wherein said selectively operable means comprises a pin on said collet receiver slidably engageable in a groove of said tool.

13. An apparatus for machining axially spaced first and second throws on a shaft having a central axis wherein the throws are displaced laterally outwardly from said central axis in angularly spaced relation to one another, comprising a spindle having an axis of rotation, means for axially rotating the spindle, a chuck for gripping the shaft, a chuck housing rotatably receiving said chuck, means for mounting said chuck housing on the spindle in radially outwardly spaced relation to the axis of rotation of the spindle such that the chuck is rotatable in said chuck housing to a first position in which the first throw of the shaft is on the axis of spindle rotation and to a second position in which the second throw of the shaft is on the axis of spindle rotation, and releasable locking means for locking said chuck in said respective first and second positions.

14. The apparatus according to claim 13, further including means selectively operable to restrain said chuck from rotating so that by a partial rotation of said spindle with said locking means released said chuck may be shifted from one of said first and second positions to the other.

15. The apparatus according to claim 14, wherein said mounting means for said chuck housing includes means for securing said chuck housing at various points offset different distances from the spindle axis.

* * * * *